R. D. ELLIOTT.
CULTIVATOR AND ATTACHMENT.
APPLICATION FILED AUG. 6, 1909.

951,238.

Patented Mar. 8, 1910.

2 SHEETS—SHEET 1.

Witnesses

Inventor
Richard D. Elliott.
By C. A. Snow & Co.
Attorneys

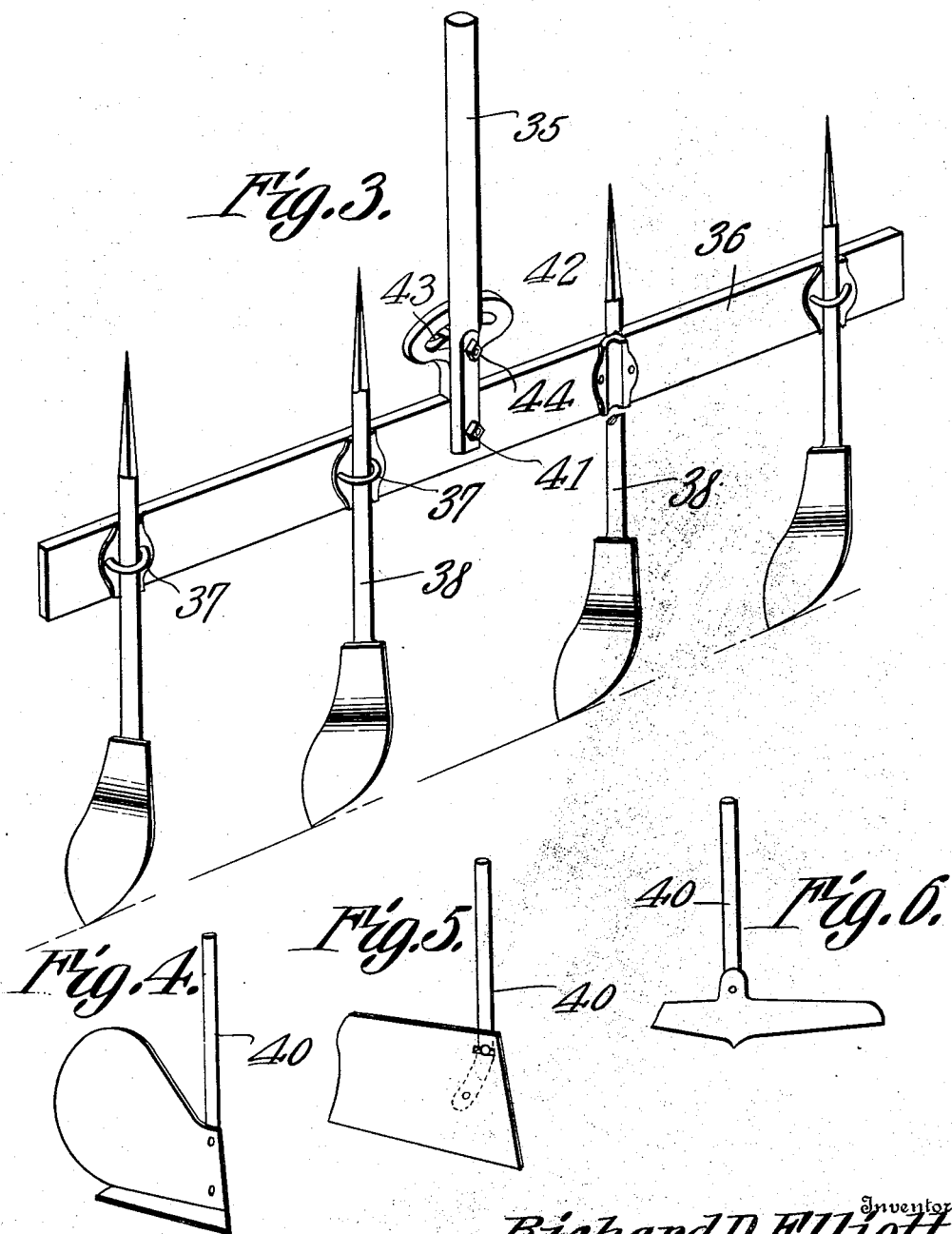

UNITED STATES PATENT OFFICE.

RICHARD D. ELLIOTT, OF HERTFORD NORTH CAROLINA.

CULTIVATOR AND ATTACHMENT.

951,238.  Specification of Letters Patent.  Patented Mar. 8, 1910.

Application filed August 6, 1909. Serial No. 511,630.

*To all whom it may concern:*

Be it known that I, RICHARD D. ELLIOTT, a citizen of the United States, residing at Hertford, in the county of Perquimans and State of North Carolina, have invented a new and useful Cultivator and Attachment, of which the following is a specification.

This invention relates to cultivators and attachments and its object is to provide a simple, durable and efficient device of this character which can be readily adjusted to any desired position relative to the cultivator bar.

Another object is to provide a harrow attachment utilizing a single stem capable of being inserted into a supporting structure in lieu of the stem or standard of a cultivator shovel or a device of the like nature.

With these and other objects in view the invention consists in certain novel details of construction and combinations of parts hereinafter more fully described and pointed out in the claims.

In the accompanying drawings the preferred form of the invention has been shown.

Figure 1:
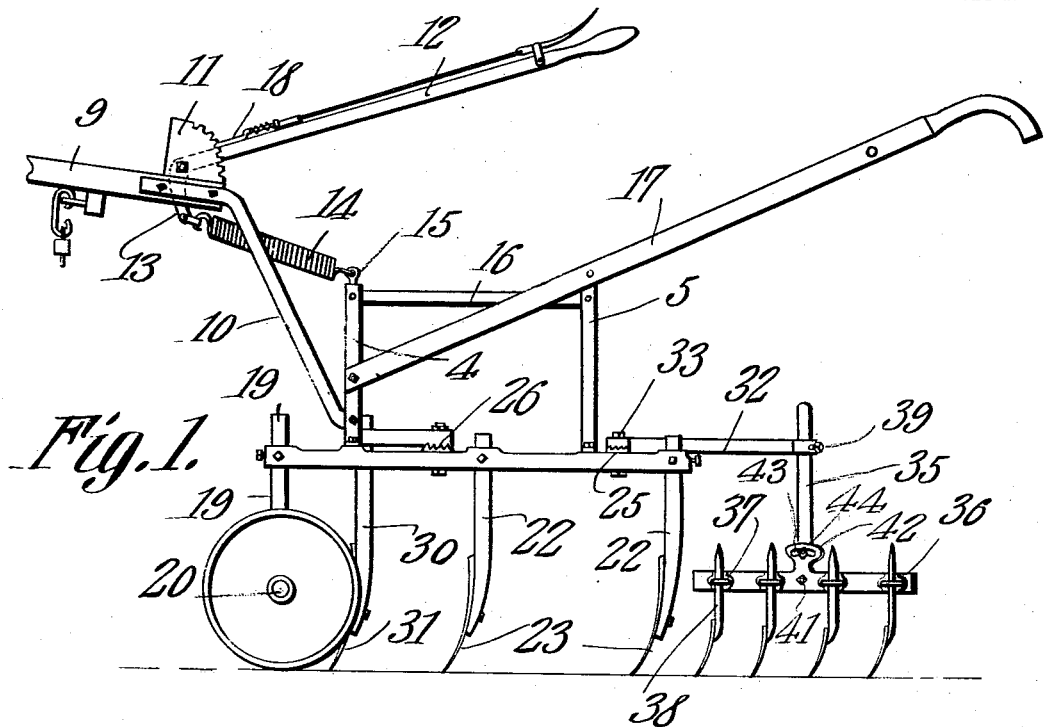
Figure 2:
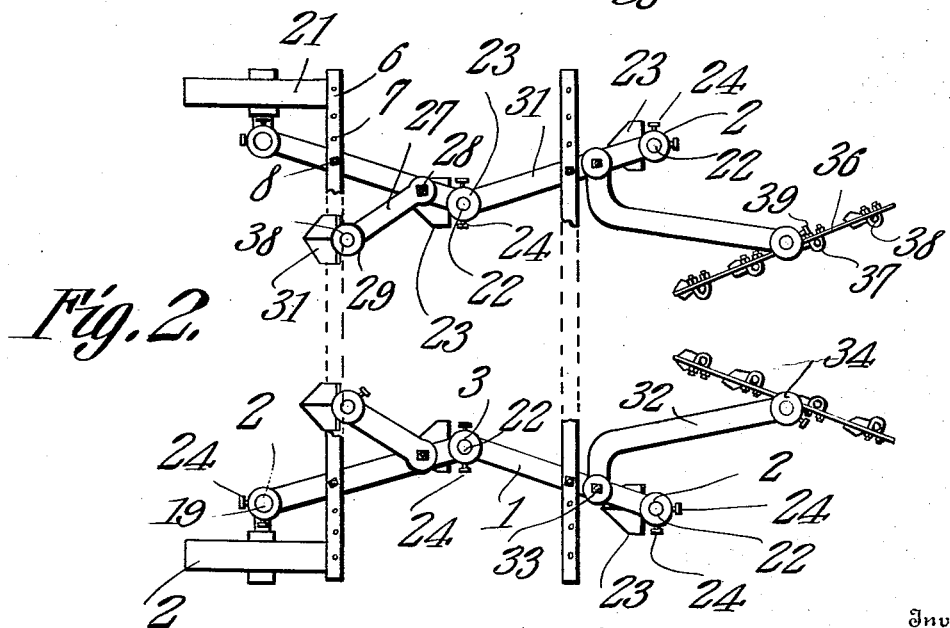

In said drawings: Figure 1 is a side elevation of a cultivator having the present improvement applied thereto. Fig. 2 is a plan view of a portion of the cultivator showing cultivator and attachments connected thereto. Fig. 3 is a perspective view of one of the harrow attachments. Figs. 4, 5, and 6 are perspective views of different attachments which may be used in connection with the cultivator.

Referring to the figures by characters of reference, 1 designates oppositely disposed similar angular bars each of which is provided at its terminals with eyes 2 while another eye 3 is located at the angle of each bar. The two bars are connected at points adjacent their ends, by upstanding U-shaped members 4 and 5 formed preferably of metal strips having laterally extending feet 6. Each of these feet is provided with a series of apertures 7 any one of which is designed to receive a clamping bolt 8 extending through the bar 1. It will be seen therefore that by connecting the parts in this manner the two bars can be held at any desired distance apart. The tongue 9 of the machine is connected to the member 4 by means of braces 10 and this tongue has a toothed segment 11 thereon on which an actuating lever 12 is fulcrumed. An arm 13 extends from the lever 12 and is connected by means of the spring 14 with the upper portion of the connecting member 4, as indicated at 15. A brace 16 connects the upper portions of the two members 4 and 5 and secured to these members 4 and 5 are the handle bars 17.

It is to be understood of course that the lever 12 is provided with the usual form of pawl 18 for engaging the segment 11 to lock the lever in any position to which it may be shifted. This lever is provided so as to permit the operator to regulate the depth of cultivation while in use.

Standards 19 are removably mounted within the front eye 2 on the bars 1 and each of these standards is provided at its lower end with a laterally extending stud 20 on which a wheel 21 is journaled. Standards 22 are also removably mounted within the rear eyes 2 and within the intermediate eyes 3, these standards 22 being provided with shovels 23 at the lower ends thereof. All of the standards 19 and 22 are designed to be locked in adjusted position within the eyes by means of set screws 24.

A boss 25 is formed on each bar 1 in front of and adjacent the rear eye 2 and another boss 26 is formed on each bar in front of and adjacent the middle eye 3. Each boss has an opening extending through the center thereof and through the bar while the upper face of the boss is formed with radial teeth. The teeth on the boss 26 are designed to engage corresponding teeth formed on one end of an arm 27, said arm being held in engagement with the boss by means of a clamping bolt 28 extending through the arm and boss and through the bar. An eye 29 is formed at the free end of the arm 27 and this eye is designed to receive a standard 30 similar to the standards 22, there being a shovel 31 at the lower end of the standard. The rear bosses 25 are engaged by teeth formed at one end of arms 32, bolts 33 being extended through these arms and the bosses for the purpose of binding the arms in engagement with said bosses. As shown in Fig. 2, each of the arms 32 is angular and is provided at its rear end with an eye 34. This eye is designed to receive a stem or standard 35 extending upwardly from the middle portion of a bar 36 pivotally connected thereto as at 41. A head 42 is formed on the center of the bar and has an actuating slot 43 for the reception of a clamping bolt 44 whereby the bar can be tilted and secured at any desired angle to the standard 35. U bolts 37 are extended through the head 36, each of these bolts engaging a harrow tooth 38. A shovel 39 may be arranged at one end of each tooth while the other end thereof may be pointed, it thus being possible to reverse each tooth to permit either end thereof to be used in harrowing the ground. Set screws 39 are preferably employed for locking the stems 35 within the eyes after they have been properly adjusted.

In using the device herein described the arms 32 are adjusted to desired angles relative to the bars 1 and the stems 35 of the harrow attachment are adjusted longitudinally within the eyes 34 and rotated so as to bring the heads 36 at desired angles to each other, said heads can then be tilted in the manner described if so desired. The teeth carried by the head 36 will operate to pulverize the soil and, by manipulating the lever 25, motion may be transmitted from arm 13 through spring 14 to the forward connection 4 of the frame, thus serving to tilt the entire machine. The arms 27 can of course be adjusted at different angles relative to the bars so as to bring the shovels 31 at desired distances apart.

If preferred, in lieu of utilizing the harrow attachment shown in Figs. 1, 2, and 3 any one or more of the forms of shovels shown in Figs. 4, 5, and 6 can be substituted therefor, the stems 40 of the said devices being inserted into the eyes 2, 3 and 34 in lieu of the other stems or standards, they being held at any desired angles by set screws. The forms of devices shown in Figs. 4, 5, and 6 can be utilized for breaking the soil, for cutting weeds, and so forth.

It is to be understood of course that various changes may be made in the construction and arrangement of parts without departing from the spirit or sacrificing the advantages of the invention.

What is claimed is:

1. In a cultivator opposed side bars, adjustable connections therebetween, supporting wheels adjustably connected to the bars, arms adjustably connected to said bars, and a harrow attachment connected to each of said arms, each attachment including a stem adjustable in the direction of its length, a head pivotally connected to the stem, and a plurality of teeth detachably connected to the head.

2. A cultivator including opposed side bars, adjustable connections therebetween, supporting wheels, arms pivotally attached to the bars, means engaging the bars and arms for holding said arms against movement relative to the bars, and tilling devices movable with the arms and simultaneously adjustable upwardly relative to each arm.

3. A cultivator including opposed side bars, adjustable connections therebetween, arms pivotally connected to the side bars, means extending through the arms and bars for holding said arms against movement relative to the bars, stems extending through and detachably mounted within the arms, said stems being adjustable in the direction of their length, and tilling devices movable with the stems.

4. A cultivator including opposed side bars, adjustable connections therebetween, arms pivotally mounted upon the bars, coöperating means upon the bars and arms for holding said arms against movement relative to the bars, means extending through the arms and bars for binding them together, and a harrow attachment for each arm, each attachment including a stem rotatably mounted within one of the arms and adjustable in the direction of the length of the stem, a head pivotally mounted upon the stem, means for securing the head against movement upon the stem, and a series of teeth detachably connected to the head.

In testimony that I claim the foregoing as my own, I have hereto affixed my signature in the presence of two witnesses.

RICHARD D. ELLIOTT.

Witnesses:
E. HUME TALBERT,
E. C. SCHLADT.